United States Patent
Collina et al.

(10) Patent No.: US 7,316,987 B2
(45) Date of Patent: Jan. 8, 2008

(54) COMPONENTS AND CATALYSTS FOR THE POLYMERIZATION OF OLEFINS

(75) Inventors: Gianni Collina, Ferrara (IT); Ofelia Fusco, Ferrara (IT); Diego Brita, Ferrara (IT)

(73) Assignee: Basell Poliolefine Italia S.p.A., Milan (IT)

( * ) Notice: Subject to any disclaimer, the term of this patent is extended or adjusted under 35 U.S.C. 154(b) by 562 days.

(21) Appl. No.: 10/362,695

(22) PCT Filed: Jun. 24, 2002

(86) PCT No.: PCT/EP02/07467

§ 371 (c)(1),
(2), (4) Date: Feb. 26, 2003

(87) PCT Pub. No.: WO03/002617

PCT Pub. Date: Jan. 9, 2003

(65) Prior Publication Data

US 2004/0048738 A1    Mar. 11, 2004

(30) Foreign Application Priority Data

Jun. 26, 2001  (EP) .................... 01202451

(51) Int. Cl.
*B01J 37/04* (2006.01)
*C08F 4/02* (2006.01)

(52) U.S. Cl. .......... 502/126; 502/103; 502/127; 502/134; 526/348; 526/124.3; 526/124.2; 526/142; 526/209

(58) Field of Classification Search ........ 502/103, 502/126, 127, 134; 526/348, 124.3, 124.2, 526/142, 209
See application file for complete search history.

(56) References Cited

U.S. PATENT DOCUMENTS

| 4,298,718 A | | 11/1981 | Mayr et al. ............ 526/125 |
|---|---|---|---|
| 4,399,054 A | | 8/1983 | Ferraris et al. ......... 252/429 B |
| 4,469,648 A | | 9/1984 | Ferraris et al. .......... 264/9 |
| 4,495,338 A | | 1/1985 | Mayr et al. ............ 526/125 |
| 4,619,981 A | * | 10/1986 | Tajima et al. .......... 526/125.3 |
| 5,733,987 A | | 3/1998 | Covezzi et al. ......... 526/65 |
| 6,358,372 B1 | * | 3/2002 | Zum Mallen .......... 203/6 |

FOREIGN PATENT DOCUMENTS

| EP | 338676 | 10/1989 |
|---|---|---|
| EP | 360453 | 3/1990 |
| GB | 2159523 | 12/1985 |
| WO | 9221706 | 12/1992 |
| WO | 9303078 | 2/1993 |
| WO | 9957160 | 11/1999 |

* cited by examiner

*Primary Examiner*—Ling-Sui Choi
(74) *Attorney, Agent, or Firm*—Jarrod N Raphael; William R Reid

(57) ABSTRACT

Catalyst component for the polymerization of olefins obtainable by contacting: (i) a magnesium halide, or a suitable precursor; (ii) a monofunctional electron donor compound (MD) selected from ethers, esters, amines or ketones, used in such amounts to have Mg/MD molar ratios of at least 50; (iii) a titanium compound of formula $Ti(ORI)_{n-y}X_y$, where n is the valence of titanium, y is a number between 1 and n, X is halogen, and RI is a C1-C15 hydrocarbon group and, optionally, (iv) an electron donor compound (ED). The said catalyst component shows improved activity in the polymerization of olefins.

19 Claims, No Drawings

COMPONENTS AND CATALYSTS FOR THE POLYMERIZATION OF OLEFINS

This application is the U.S. national phase of International Application PCT/EP02/07467, filed Jun. 24, 2002.

The present invention relates to catalyst components for the polymerization of olefins, to the catalyst obtained therefrom and to the use of said catalysts in the (co)polymerization of olefins $CH_2=CHR$ in which R is hydrogen or a hydrocarbyl radical with 1-12 carbon atoms. In particular the present invention relates to catalyst components, suitable for the (co)polymerization of olefins, comprising Mg, Ti, halogen and, optionally, an electron donor compound, that are obtainable by the use of a specific procedure. Said catalyst components are endowed with high activity and stereospecificity when used in the (co)polymerization of propylene or higher alpha olefins. In the polyolefin field Ziegler-Natta supported catalysts are customarily used for the preparation of homo or copolymers of olefins such as ethylene, propylene, butene-1 and so forth. One of the key requirements of the supported catalysts used for the preparation of propylene polymers is the capability of giving high yields coupled with high stereospecificity. The use of electron donor compounds in the preparation of the Ziegler/Natta catalysts comprising a titanium compound on a magnesium-containing support is very well known. Such electron donor compounds are very often used in order to increase the stereospecificity of the catalyst in particular when the polymerization of prochiral olefins is carried out. Generally, in order to achieve the desired effect, the electron donor compound is used in such amounts that at the end of the preparation process an appreciable and effective amount of it remains on the catalyst component. In order to obtain the explained effect the electron donor compounds generally disclosed in the art are mono or polyfunctional ethers, esters and amines. Sometimes, as disclosed in WO99/57160, is used a combination of two or more electron donor compounds in order to obtain a catalyst endowed with specific properties. Also in this case however, the amounts of donor and the preparation conditions are selected in such a way of having, on the final catalyst, a substantive amount of both donors. We have now surprisingly found that certain supported catalyst components obtainable by a specific preparation procedure are capable to give increased yields over the catalysts of the prior art. The specific procedure comprises the use of such a low amount of certain electron donor compounds that at the end of the preparation process it may also be not present on the final catalyst component. The catalyst component of the invention, however, results to be greatly improved with respect to the catalysts that have not been contacted with such electron donor compound.

It is therefore an object of the present invention a catalyst component for the polymerization of olefins comprising Ti, Mg, and halogen obtainable by contacting:
(i) a magnesium halide, or a suitable precursor;
(ii) a monofunctional electron donor compound (MD) selected from ethers, esters, amines or ketones, used in such amounts to have Mg/MD molar ratios of at least 50;
(iii) a titanium compound of formula $Ti(OR^I)_{n-y}X_y$, where n is the valence of titanium, y is a number between 1 and n, X is halogen, and $R^I$ is a C1-C15 hydrocarbon group; and optionally,
(iv) an electron donor compound (ED).

Preferably, the catalyst component is obtainable by a procedure comprising contacting a magnesium halide, or a suitable precursor, with a titanium compound of formula $Ti(OR^I)_{n-y}X_y$, where n is the valence of titanium, y is a number between 1 and n, X is halogen, and $R^I$ is a C1-C15 hydrocarbon group in the presence of a monofunctional electron donor compound (MD) selected from ethers, esters, amines or ketones, used in such amounts to have Mg/MD molar ratios of at least 50. Preferably the monofunctional electron donor compound (MD) is selected from esters or ethers and, in particular from esters of monocarboxylic aromatic or aliphatic acids. Particularly preferred are the esters of monocarboxylic aromatic acids such as ethylbenzoate, n-butylbenzoate, p-methoxy ethylbenzoate, p-ethoxy ethylbenzoate, isobutylbenzoate, ethyl p-toluate. Among monoethers particularly preferred are the aliphatic ethers and in particular the cyclic ethers such as tetrahydrofurane and tetrahydropyran.

As explained above, such monofunctional electron donor compound is used in amount such that the ratio Mg/MD molar ratio is at least 50. Preferably, such ratio is higher than 60 and more preferably higher than 70. The preferred titanium compounds used in the catalyst component of the present invention are $TiCl_4$ and $TiCl_3$; furthermore, also Ti-haloalcoholates of formula $Ti(OR)_{n-y}X_y$ can be used, where n is the valence of titanium, y is a number between 1 and n−1, X is halogen and R is a hydrocarbon radical having from 1 to 10 carbon atoms. The magnesium dihalide can be used as such or in the form of a suitable precursor. Particularly preferred is the use of the magnesium dihalide in active form or of a suitable precursor. The magnesium halide in active form is preferably $MgCl_2$ which is widely known from the patent literature as a support for Ziegler-Natta catalysts. patents U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the ASTM-card reference of the spectrum of the non-active halide is diminished in intensity and broadened. In the X-ray spectra of preferred magnesium dihalides in active form said most intense line is diminished in intensity and replaced by a halo whose maximum intensity is displaced towards lower angles relative to that of the most intense line. One method for obtaining magnesium chloride in active form comprises for example the reaction of magnesium dialkyl compounds or Grignard compounds with suitable chlorinating agents such as hydrogen chloride or halogenated aluminumalkyls like diethylaluminum chloride. The so obtained magnesium chloride is then reacted with the titanium compound (preferably an excess of $TiCl_4$ at a temperature of about 80 to 135° C. is used) and the electron donor compound MD in order to obtain the catalyst component of the invention. A preferred embodiment constitutes the preparation of the catalyst component in which a magnesium halide precursor is used, which is then converted into the magnesium dihalide during the reaction with the titanium compound. According to a preferred method, the solid catalyst component can be prepared by reacting a titanium compound of formula $Ti(OR^I)_{4-y}X_y$, preferably $TiCl_4$, where y is a number between 1 and 4, and X and $R^I$ have the meaning previously explained, with a magnesium chloride deriving from an adduct of formula $MgCl_2 \cdot pR^{II}OH$, where p is a number between 0.1 and 6, preferably from 2 to 3.5, and $R^{II}$ is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-

130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$; the mixture is heated up to 80-130° C. and kept at this temperature for 0.5-2 hours. The treatment with $TiCl_4$ can be carried out one or more times. The electron donor compound MD can be added separately to the $MgCl_2$-alcohol adduct or, preferably, during the treatment (preferably the first) with $TiCl_4$ In this embodiment the MD is preferably added to the mixture of $TiCl_4$ and $MgCl_2$-alcohol adduct at a temperature ranging from –15 to 150° C., preferably from –10 to 10° C. As explained above the temperature of the system is then raised to 80-130° C. and kept at this temperature for 0.5-2 hours. After that, the slurry is separated off and the solid phase can be subject to further treatments with $TiCl_4$. When a stereospecific catalyst is to be prepared, it may be necessary to introduce a further electron donor compound (ED), different from MD, on the catalyst component. The ED compound can be added at any stage of the preparation process but at least a first aliquot of the total amount is preferably added during the first contact treatment of $TiCl_4$, $MgCl_2$-alcohol adduct and MD compound. It is especially preferred the addition of the ED compound after the addition of $TiCl_4$, $MgCl_2$-alcohol adduct and MD when the mixture is being heated up. It is particularly preferred to carry out the said addition at temperatures of the mixture ranging from 20 to 100° C. preferably from 30 to 90° C. The ED compound is preferably selected from the group consisting of difunctional electron donor compounds such as diesters, diketones, diamines and diethers. More preferably it is selected from diethers and diesters of dicarboxylic acids. Particularly preferred are the compounds belonging to the class of the 1,3-diethers. In particular, preferred 1,3-diethers are those of formula (I)

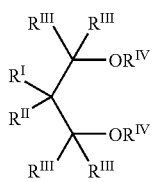
(I)

where $R^I$ and $R^{II}$ are the same or different and are hydrogen or linear or branched $C_1$-$C_{18}$ hydrocarbon groups which can also form one or more cyclic structures; $R^{III}$ groups, equal or different from each other, are hydrogen or $C_1$-$C_{18}$ hydrocarbon groups; $R^{IV}$ groups equal or different from each other, have the same meaning of $R^{III}$ except that they cannot be hydrogen; and each of $R^I$ to $R^{IV}$ groups can contain heteroatoms selected from halogens, N, O, S and Si.

Preferably, $R^{IV}$ is a 1-6 carbon atom alkyl radical and more particularly a methyl while the $R^{III}$ radicals are preferably hydrogen. Moreover, when $R^I$ is methyl, ethyl, propyl, or isopropyl, $R^{II}$ can be ethyl, propyl, isopropyl, butyl, isobutyl, tert-butyl, isopentyl, 2-ethylhexyl, cyclopentyl, cyclohexyl, methylcyclohexyl, phenyl or benzyl; when $R^I$ is hydrogen, $R^{II}$ can be ethyl, butyl, sec-butyl, tert-butyl, 2-ethylhexyl, cyclohexylethyl, diphenylmethyl, p-chlorophenyl, 1-naphthyl, 1-decahydronaphthyl; $R^I$ and $R^{II}$ can also be the same and can be ethyl, propyl, isopropyl, butyl, isobutyl, tert-butyl, neopentyl, phenyl, benzyl, cyclohexyl, cyclopentyl.

Specific examples of ethers that can be advantageously used include: 2-(2-ethylhexyl)-1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1-decahydronaphthyl)-1,3-dimethoxypropane, 2(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane,2,2-2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimetoxypropane, 2,2-di-sec-butyl-1,3-dimetoxypropane, 2,2-di-tert-butyl-1,3-dimethoxypropane, 2,2-di-neopentyl-1,3-dimethoxypropane, 2-iso-propyl-2-isopentyl-1,3-dimethoxypropane, 2-phenyl-2-benzyl-1,3-dimetoxypropane, 2-cyclohexyl-2-cyclohexylmethyl-1,3-dimethoxypropane.

Furthermore, particularly preferred are the 1,3-diethers of formula (II):

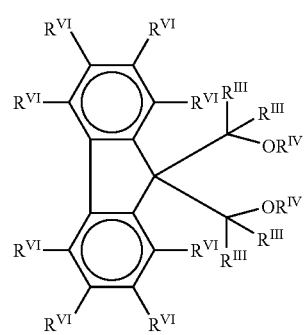
(II)

where the $R^{VI}$ radicals equal or different are hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ aralkyl radicals, optionally containing one or more heteroatoms selected from the group consisting of N, O, S, P, Si and halogens, in particular Cl and F, as substitutes for carbon or hydrogen atoms, or both; the radicals $R^{III}$ and $R^{IV}$ are as defined above for formula (I).

Specific examples of compounds comprised in formulae (II) and (III) are:

1,1-bis(methoxymethyl)-cyclopentadiene;
1,1-bis(methoxymethyl)-2,3,4,5-tetramethylcyclopentadiene;
1,1-bis(methoxymethyl)-2,3,4,5-tetraphenylcyclopentadiene;
1,1-bis(methoxymethyl)-2,3,4,5-tetrafluorocyclopentadiene;
1,1-bis(methoxymethyl)-3,4-dicyclopentylcyclopentadiene;
1,1-bis(methoxymethyl)indene; 1,1-bis(methoxymethyl)-2,3-dimethylindene;
1,1-bis(methoxymethyl)-4,5,6,7-tetrahydroindene;
1,1-bis(methoxymethyl)-2,3,6,7-tetrafluoroindene;
1,1-bis(methoxymethyl)-4,7-dimethylindene;
1,1-bis(methoxymethyl)-3,6-dimethylindene;
1,1-bis(methoxymethyl)-4-phenylindene;
1,1-bis(methoxymethyl)-4-phenyl-2-methylindene;
1,1-bis(methoxymethyl)-4-cyclohexylindene;
1,1-bis(methoxymethyl)-7-(3,3,3-trifluoropropyl)indene;
1,1-bis(methoxymethyl)-7-trimethyisilylindene;
1,1-bis(methoxymethyl)-7-trifluoromethylindene;
1,1-bis(methoxymethyl)-4,7-dimethyl-4,5,6,7-tetrahydroindene;
1,1-bis(methoxymethyl)-7-methylindene;
1,1-bis(methoxymethyl)-7-cyclopenthylindene;
1,1-bis(methoxymethyl)-7-isopropylindene;
1,1-bis(methoxymethyl)-7-cyclohexylindene;
1,1-bis(methoxymethyl)-7-tert-butylindene;
1,1-bis(methoxymethyl)-7-tert-butyl-2-methylindene;
1,1-bis(methoxymethyl)-7-phenylindene;
1,1-bis(methoxymethyl)-2-phenylindene;
1,1-bis(methoxymethyl)-1H-benz[e]indene;
1,1-bis(methoxymethyl)-1H-2-methylbenz[e]indene;
9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxynethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydrofluorene;
9,9-bis(methoxymethyl)-4-tert-butylfluorene.

The diesters can be esters of aliphatic or aromatic dicarboxyilic acids. Among esters of aliphatic dicarboxylic acids particularly preferred are the malonates, glutarates and succinates. Among malonates, particularly preferred are those of formula (III):

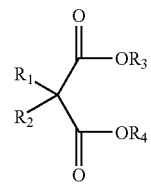

where $R_1$ is H or a $C_1$-$C_{20}$ linear or branched alkyl, alkenyl, cycloalkyl, aryl, arylalkyl or alkylaryl group, $R_2$ is a $C_1$-$C_{20}$ linear or branched alkyl, alkenyl, cycloalkyl, aryl, arylalkyl or alkylaryl group, $R_3$ and $R_4$, equal to, or different from, each other, are $C_1$-$C_{20}$ linear or branched alkyl groups or $C_3$-$C_{20}$ cycloalkyl groups.

Preferably, $R_3$ and $R_4$ are primary, linear or branched $C_1$-$C_{20}$ alkyl groups; more preferably they are primary branched $C_4$-$C_{20}$ alkyl groups such as isobutyl or neopentyl groups.

$R_2$ is preferably, in particular when $R_1$ is H, a linear or branched $C_3$-$C_{20}$ alkyl, cycloalkyl, or arylalkyl group; more preferably $R_2$ is a $C_3$-$C_{20}$ secondary alkyl, cycloalkyl, or arylalkyl group. Specific examples of preferred monosubstituted malonate compounds are: dineopentyl 2-isopropylmalonate, diisobutyl 2-isopropylmalonate, di-n-butyl 2-isopropylmalonate, diethyl 2-dodecylmalonate, diethyl 2-t-butylmalonate, diethyl 2-(2-pentyl)malonate, diethyl 2-cyclohexylmalonate, dineopentyl 2-t-butylmalonate, dineopentyl 2-isobutylmalonate, diethyl 2-cyclohexylmethylmalonate, dimethyl 2-cyclohexylmethylmalonate. Specific examples of preferred disubstituted malonates compounds are: diethyl 2,2-dibenzylmalonate, diethyl 2-isobutyl-2-cyclohexylmalonate, dimethyl 2-n-butyl-2-isobutylmalonate, diethyl 2-n-butyl-2-isobutylmalonate, diethyl 2-isopropyl-2-n-butylmalonate, diethyl 2-methyl-2-isopropylmalonate, diethyl 2-isopropyl-2-isobutylmalonate, diethyl 2-methyl-2-isobutylmalonate, diethyl 2-isobutyl-2-benzylmalonate. Preferred esters of aromatic dicarboxylic acids are selected from $C_1$-$C_{20}$ alkyl or aryl esters phthalic acids, possibly substituted. The alkyl esters of the said acids are preferred. Particularly preferred are the $C_1$-$C_6$ linear or branched alkyl esters. Specific examples are diethyl phthalate, di-n-propyl phthalate, di-n-butyl phthalate, di-n-pentyl phthalate, di-i-pentyl phthalate, bis(2-ethylhexyl) phthalate, ethyl-isobutyl phthalate, ethyl-n-butyl phthalate, di-n-hexyl phthalate, diisobutylphthalate.

The electron donor compound ED is normally present in amounts such as to give a Ti/ED molar ratio of higher than 1 and preferably higher than 1.5. As far as the content of the MD compound is concerned, as explained above, it is generally present in the catalyst components in amounts lower than 1% by weight with respect to the total weight of the solid catalyst components without solvent and preferably lower than 0.5% by weight. In some instances the MD compound could also be not present on the solid catalyst component. When MD is present the molar ratio ED/MD is higher than 10, preferably higher than 15 and more preferably higher than 30. When prepared with the above preferred method the catalyst components of the invention show a surface area (by B.E.T. method) generally between 20 and 500 $m^2/g$ and preferably between 50 and 400 $m^2/g$, and a total porosity (by B.E.T. method) higher than 0.2 $cm^3/g$, preferably between 0.2 and 0.6 $cm^3/g$. The porosity (Hg method) due to pores with radius up to 10,000 Å generally ranges from 0.3 to 1.5 cm$^3$/g, preferably from 0.45 to 1 cm$^3$/g. The solid catalyst components according to the present invention are converted into catalysts for the polymerization of olefins by reacting them with suitable cocatalysts. Among them organoaluminum compounds are preferred. In particular, it is an object of the present invention that a catalyst for the polymerization of olefins CH$_2$=CHR, in which R is hydrogen or a hydrocarbyl radical with 1-12 carbon atoms, comprises the product of the reaction between:

(i) a catalyst component for the polymerization of olefins comprising Ti, Mg, halogen and optionally an electron donor compound (ED) obtainable by a procedure comprising contacting a magnesium halide, or a suitable precursor, with a titanium compound of formula Ti(OR$^I$)$_{n-y}$, where n is the valence of titanium, y is a number between 1 and n, X is halogen, and R$^I$ is a C1-C15 hydrocarbon group in the presence of a monofunctional electron donor compound (MD) selected from ethers, esters, amines or ketones, used in such amounts to have Mg/MD molar ratios of at least 50;

(ii) an alkylaluminum compound; and optionally, (iii) one or more electron-donor compounds (external donor).

The alkyl-Al compound (b) is preferably selected from trialkyl aluminum compounds such as, for example, triethylaluminum, triisobutylaluminum, tri-n-butylaluminum, tri-n-hexylaluminum, and tri-n-octylaluminum. It is also possible to use mixtures of trialkylaluminum's with alkylaluminum halides, alkylaluminum hydrides or alkylaluminum sesquichlorides such as AlEt$_2$Cl and Al$_2$Et$_3$Cl$_3$.

The external donor (c) can be selected among silicon compounds, ethers, esters such as ethyl 4-ethoxybenzoate, amines, heterocyclic compounds and particularly 2,2,6,6-tetramethyl piperidine, and ketones. One particular class of preferred external donor compounds is that of silicon compounds of formula R$_a^5$R$_b^6$Si(OR$^7$)$_c$, where a and b are integer from 0 to 2, c is an integer from 1 to 3 and the sum (a+b+c) is 4; R$^5$, R$^6$, and R$^7$, are alkyl, cycloalkyl or aryl radicals with 1-18 carbon atoms optionally containing heteroatoms. Particularly preferred are the silicon compounds in which a is 1, b is 1, c is 2, at least one of R$^5$ and R$^6$ is selected from branched alkyl, cycloalkyl or aryl groups with 3-10 carbon atoms optionally containing heteroatoms and R$^7$ is a C1-C10 alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane, 1,1,1,-trifluoropropyl-metil-dimethoxysilane and 1,1,1, trifluoropropyl-2-ethylpiperidinyl-dimethoxysilane. Moreover, are also preferred the silicon compounds in which a is 0, c is 3, R$^6$ is a branched alkyl or cycloalkyl group, optionally containing heteroatoms, and R$^7$ is methyl. Examples of such preferred silicon compounds are cyclohexyltrimethoxysilane, t-butyltrimethoxysilane and thexyltrimethoxysilane. The electron donor compound (c) is used in such an amount to give a molar ratio between the organoaluminum compound and said electron donor compound (c) of from 0.1 to 500, preferably from 1 to 300 and more preferably from 3 to 100. As previously indicated, the said catalyst are suitable for preparing a broad range of polyolefin products. In particular they are suitable for preparing isotactic polypropylenes and crystalline copolymers of propylene and ethylene and/or other alpha-olefins having a content of units derived from propylene of higher than 85% by weight.

However, they can also be used to prepare, for example, high density ethylene polymers APE, having a density higher than 0.940 g/cm$^3$), comprising ethylene homopolymers and copolymers of ethylene with alpha-olefins having 3-12 carbon atoms; elastomeric copolymers of ethylene and propylene and elastomeric terpolymers of ethylene and propylene with smaller proportions of a diene having a content by weight of units derived from ethylene of between about 30 and 70%; impact resistant polymers of propylene obtained by sequential polymerization of propylene and mixtures of propylene with ethylene, containing up to 30% by weight of ethylene; copolymers of propylene and 1-butene having a number of units derived from 1-butene of between 10 and 40% by weight. In view of the above, it constitutes a further object of the present invention a process for the (co)polymerization of olefins CH$_2$=CHR, in which R is hydrogen or a hydrocarbyl radical with 1-12 carbon atoms, carried out in the presence of the catalyst described above. The olefins can be selected in particular from ethylene, propylene, butene-1,4-methyl-1-pentene, hexene-1, octene-1. The polymerization process using the catalyst of the invention can be carried out according to known techniques either in liquid or gas phase using, for example, the known technique of the fluidized bed or under conditions wherein the polymer is mechanically stirred. The catalyst of the present invention can be used as such in the polymerization process by introducing it directly into the reactor. However, it constitutes a preferential embodiment the prepolymerization of the catalyst with an olefin. In particular, it is especially preferred prepolymerizing ethylene, or propylene or mixtures thereof with one or more α-olefins, said mixtures containing up to 20% by mole of α-olefin, forming amounts of polymer from about 0.1 g per gram of solid component up to about 1000 g per gram of solid catalyst component. The pre-polymerization step can be carried out at temperatures from 0 to 80° C. preferably from 5 to 50° C. in liquid or gas-phase. The pre-polymerization step can be performed in-line as a part of a continuos polymerization process or separately in a batch process. The batch pre-polymerization of the catalyst of the invention with ethylene in order to produce an amount of polymer ranging from 0.5 to 20 g per gram of catalyst component is particularly preferred. The main polymerization process in the presence of catalysts obtained from the catalytic components of the invention can be carried out according to known techniques either in liquid or gas phase using for example the known technique of the fluidized bed or under conditions wherein the polymer is mechanically stirred. Preferably the process is carried out in the gas phase. Examples of gas-phase processes wherein it is possible to use the spherical components of the invention are described in WO92/21706, U.S. Pat. No. 5,733,987 and WO93/03078. In this processes a pre-contacting step of the catalyst components, a pre-polymerization step and a gas phase polymerization step in one or more reactors in a series of fluidized or mechanically stirred bed are comprised. Therefore, in the case that the polymerization takes place in gas-phase, the process of the invention is suitably carried out according to the following steps:

(a) contact of the catalyst components in the absence of polymerizable olefin or optionally in the presence of said olefin in amounts not greater than 20 g per gram of the solid component (A);

(b) pre-polymerization of ethylene or mixtures thereof with one or more α-olefins, said mixtures containing up to 20% by mole of α-olefin, forming amounts of polymer from about 0.1 g per gram of solid component (A) up to about 1000 g per gram;

(c) gas-phase polymerization of one or more olefins $CH_2$=CHR, in which R is hydrogen or a hydrocarbon radical having 1-10 carbon atoms, in one or more fluidized or mechanically stirred bed reactors using the pre-polymer-catalyst system coming from (b).

As mentioned above, the pre-polymerization step can be carried out separately in batch. In this case, the pre-polymerized catalyst is pre-contacted according to step (a) with the aluminum alkyl and then directly sent to the gas-phase polymerization step (c).

The Molecular Weight of the polymer is normally controlled using hydrogen or other agents capable to regulate the Molecular Weight. If needed the polymerization process of the invention can be performed in two or more reactors working under different conditions and optionally by recycling, at least partially, the polymer which is formed in the second reactor to the first reactor. As an example the two or more reactors can work with different concentrations of molecular weight regulator or at different polymerization temperatures or both. The following examples are given in order to further describe the present invention in a non-limiting manner.

CHARACTERIZATION

Determination of X.I.

2.5 g of polymer were dissolved in 250 ml of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference, the X.I. %.

MIE: Melt Index measured at 190° C. according to ASTM D-1238 condition "E".

MIL: Melt Index measured at 190° C. according to ASTM D-1238 condition "L".

EXAMPLES

Propylene General Polymerization Procedure

In a 4-liter autoclave, purged with nitrogen flow at 70° C. for two hours, 75 ml of anhydrous hexane containing 760 mg of $AlEt_3$, 63 mg of cyclohexylmethyldimethoxysilane and 10 mg of solid catalyst component were introduced in propylene flow at 30° C. The autoclave was closed. 1.5 Nl of hydrogen were added and then, under stirring, 1.2 Kg of liquid propylene were fed. The temperature was raised to 70° C. in five minutes and the polymerization was carried out at this temperature for two hours. The non-reacted propylene was removed, the polymer was recovered and dried at 70° C. under vacuum for three hours and then weighed and analyzed for the determination of the Mg residues by which the activity of the catalyst is calculated.

Ethylene General Polymerization Procedure

Into a 4 liters stainless steel autoclave degassed under $N_2$ stream at 70° C. for one hour, 0.02 g of spherical catalyst component, 13.7 mg of cyclohexylmethyldimethoxysilane and 0.5 g of $AlEt_3$ at room temperature were introduced.

The autoclave was closed and then 250 ml of propane and 20 g of propylene were added keeping temperature at 30° C. The polymerisation step was stopped after 45 minutes, totally discharging propane and propylene. After the introduction of 1.6 liters of propane, the temperature was raised to 75° C. and 3 bar of $H_2$ and 7 bar of ethylene were fed into the reactor. During the polymerization ethylene was fed to keep the pressure constant. After 3 hours the polymerization was discontinued and the spherical polymer was collected and dried at 70° C. under a nitrogen flow.

Example 1

Preparation of the Spherical Support ($MgCl_2$/EtOH Adduct)

The adduct of magnesium chloride and alcohol was prepared according to the method described in Example 2 of U.S. Pat. No. 4,399,054, but operating at 2000 rpm instead of 10,000 rpm. The so obtained adduct contained approximately 3 mol of alcohol.

Preparation of the Solid Component

Into a 2 L four-necked glass reactor, equipped with a mechanical stirrer and a thermometer, purged with nitrogen, 1500 mL of $TiCl_4$ were introduced and cooled at −5° C. While stirring, 45 g of microspheroidal $MgCl_2$*$2.9C_2H_5OH$ and 2.8 mmol of ethylbenzoate were added, so that Mg/EB molar ratio was 70. The suspension was heated up to 40° C. and 17.3 mmol of diisobutylphtalate were added, so that Mg/DIBP molar ratio was 8.5. The temperature was raised to 100° C. and maintained for 60 min. Then, the stirring was discontinued, the solid product was allowed to settle at 100° C. for 15 minutes and the supernatant liquid was siphoned off.

Then 1500 mL of fresh $TiCl_4$ were added on the solid product. The mixture was reacted at 120° C. for 30 min and than the stirring was stopped and the reactor cooled to 100° C.; the solid product was allowed to settle at 100° C. for 15 min and the supernatant liquid was siphoned off. Once again, 1500 mL of fresh $TiCl_4$ were added on the solid product. The mixture was reacted at 120° C. for 30 min and than the stirring was stopped and the reactor cooled to 100° C.; the solid product was allowed to settle at 100° C. for 15 min and the supernatant liquid was siphoned off. The solid was washed with 6×600 mL of anhydrous hexane three times at 60° C. and three times at room temperature. Finally, the solid was dried under vacuum, analyzed and tested. The analysis of the catalyst component and the results in the polymerization of propylene according to the above reported procedure are shown in table 1.

Example 2

The same procedure disclosed in Example 1 was repeated with the difference that the amount of EB used was such that the Mg/Ethyl benzoate molar ratio was 90. The analysis of the catalyst component and the results in the polymerization of propylene according to the above reported procedure are shown in table 1.

Comparison Example 1

The same procedure disclosed in Example 1 was repeated with the difference that EB was not used. The analysis of the catalyst component and the results in the polymerization of propylene according to the above reported procedure are shown in table 1.

Example 3

Preparation of a MgCl$_2$*2.2C$_2$H$_5$OH Adduct

The MgCl$_2$/EtOH adduct containing approximately 3 mol of alcohol prepared according to the same procedure disclosed in Example 1 was subject to temperatures that gradually increased from 50° C. to 100° C. in nitrogen current until the alcohol content is reduced to 2.2 moles per mole of MgCl$_2$.

Preparation of the Solid Component

Into a 1L four-necked glass reactor, equipped with a mechanical stirrer and a thermometer, purged with nitrogen, 800 mL of TiCl$_4$ were introduced and cooled at −5° C. While stirring, 32 g of the said microspheroidal MgCl$_2$*2.2C$_2$H$_5$OH and 3.3 mmol of ethylbenzoate were added so that Mg/EB molar ratio was 50. The suspension was heated up to 80° C. and 18.8 mmol of diisobuthylphtalate were added, so that Mg/DIBP molar ratio was 8.5. The temperature was raised to 100° C. and maintained for 120 min. Then, the stirring was discontinued, the solid product was allowed to settle at 100° C. for 15 minutes and the supernatant liquid was siphoned off. Then 800 mL of fresh TiCl$_4$ were added on the solid product. The mixture was reacted at 120° C. for 30 min and than the stirring was stopped and the reactor cooled to 100° C.; the solid product was allowed to settle at 100° C. for 15 min and the supernatant liquid was siphoned off. Once again, 800 mL of fresh TiCl$_4$ were added on the solid product. The mixture was reacted at 120° C. for 30 min and than the stirring was stopped and the reactor cooled to 100° C.; the solid product was allowed to settle at 100° C. for 15 min and the supernatant liquid was siphoned off. The solid was washed with 6×600 mL of anhydrous hexane three times at 60° C. and three times at room temperature. Finally, the solid was dried under vacuum, analyzed and tested.

Example 4

The same procedure disclosed in Example 3 was repeated with the difference that the amount of EB used was such that the Mg/Ethyl benzoate molar ratio was 90. The analysis of the catalyst component and the results in the polymerization of propylene according to the above reported procedure are shown in table 1.

Comparison Example 2

The same procedure disclosed in Example 3 was repeated with the difference that EB was not used. The analysis of the catalyst component and the results in the polymerization of propylene according to the above reported procedure are shown in table 1.

Example 5

The same procedure disclosed in Example 3 was repeated with the difference that tetrahydrofurane (THF) at Mg/THF molar ratio of 60 was used instead of EB. Moreover, the DIBF was added (Mg/DIBF molar ratio 8) when the temperature of the mixture was 40° C. The analysis of the catalyst component and the results in the polymerization of propylene according to the above reported procedure are shown in table 1.

Example 6

The same procedure disclosed in Example 5 was repeated with the difference that the amount of THF used was such that the Mg/THF molar ratio was 90. The analysis of the catalyst component and the results in the polymerization of propylene according to the above reported procedure are shown in table 1.

Example 7

The same procedure disclosed in Example 1 was repeated with the difference that the MgCl$_2$/EtOH adduct containing approximately 3 mol of alcohol was subject to temperatures that gradually increased from 50° C. to 100° C. in nitrogen current until the alcohol content is reduced to about 1.1 moles per mole of MgCl$_2$. Moreover, that the amount of EB used was such that the Mg/Ethyl benzoate molar ratio was 60 and the DIBF was added in such an amount that the Mg/DIBF molar ratio was 16. The analysis of the catalyst component and the results in the polymerization of ethylene according to the above reported procedure are shown in table 1.

Comparison Example 3

The same procedure disclosed in Example 7 was repeated with the difference that EB was not used. The analysis of the catalyst component and the results in the polymerization of ethylene according to the above reported procedure are shown in Table 1.

TABLE 1

| | COMPOSITION | | | | | | | C3⁻ POLYMERIZATION | | |
|---|---|---|---|---|---|---|---|---|---|---|
| Example | Ti (% wt) | Mg (% wt) | Cl (% wt) | MD (% wt) | ED (% wt) | Solvent (% wt) | ED/MD m.r. | ACTIVITY Kg/g | XI (%) | MIL |
| 1 | 3.3 | 15.7 | 52 | 0.1 | 11 | 17.2 | 59.4 | 82.4 | 97.9 | 8.9 |
| 2 | 2.8 | 15.4 | 51 | — | 9.5 | 20.5 | — | 84.2 | 98.2 | 7.2 |
| Comp. 1 | 3.2 | 15.1 | 54 | — | 13.3 | 11 | — | 60.6 | 98.1 | 4.7 |
| 3 | 2.5 | 15.9 | 52.5 | 0.15 | 6.55 | 19.5 | 23.6 | 70.5 | 98 | 4.8 |
| 4 | 3.3 | 17.3 | 58.2 | 0.15 | 7.85 | 9.75 | 28.2 | 76.7 | 97.8 | 10 |

TABLE 1-continued

| | | | | | | | | | | |
|---|---|---|---|---|---|---|---|---|---|---|
| Comp. 2 | 2.6 | 16.7 | 60 | — | 9.3 | 13 | — | 54.8 | 97.9 | 16 |
| 5 | 3.51 | 18.1 | 63.5 | 0.23 | 10.1 | 13.1 | | 64.6 | 97.9 | 5.6 |
| 6 | 3.76 | 18.7 | 66.2 | — | 8.7 | 21.4 | 11.35 | 66.8 | 97.8 | 7.8 |

| | COMPOSITION | | | | | | C2⁻ POLYMERIZATION | |
|---|---|---|---|---|---|---|---|---|
| | Ti (% wt) | Mg (% wt) | Cl (% wt) | MD (% wt) | ED (% wt) | Solvent | ED/MD m.r. | ACTIVITY Kg/g | MIE |
| 7 | 4.4 | 16.2 | 60.4 | 0.8 | 2.1 | 8 | 3.17 | 38 | 0.1 |
| Comp. 3 | 4.4 | 16 | 56.5 | — | 5.5 | 12.1 | — | 29 | 0.13 |

The invention claimed is:

1. A catalyst component for the polymerization of olefins obtained by contacting:
   (i) a magnesium halide, or a suitable precursor of a magnesium halide;
   (ii) a monofunctional electron donor compound (MD) selected from aliphatic ethers, esters, amines or ketones, used in such amounts to have Mg/MD molar ratios of at least 50;
   (iii) a titanium compound of formula $Ti(OR^I)_{n-y}X_y$, where n is the valence of titanium, y is a number between 1 and n, X is halogen, and $R^I$ is a C1-C15 hydrocarbon group; and optionally,
   (iv) an electron donor compound (ED).

2. The catalyst component according to claim 1 obtained by a procedure comprising contacting the magnesium halide, or the suitable precursor of the magnesium halide, with the titanium compound; of formula $Ti(OR^I)_{n-y}X_y$, where n is the valence of titanium, y is a number between 1 and n, X is halogen, and $R^I$ is a C1-C15 hydrocarbon group in the presence of a monofunctional electron donor compound (MD) selected from aliphatic ethers or esters, in such amounts to have Mg/MD molar ratios of at least 50.

3. The catalyst component according to claim 1 in which the monofunctional electron donor compound (MD) is selected from esters of monocarboxylic aromatic or aliphatic acids.

4. The catalyst component according to claim 3 in which the monofunctional electron donor compound (MD) is selected from the group consisting of ethylbenzoate, n-butylbenzoate, p-methoxy ethylbenzoate, p-ethoxy ethylbenzoate, isobutylbenzoate, and ethyl p-toluate.

5. The catalyst component according to claim 1 in which the monofunctional electron donor compound (MD) is selected from aliphatic ethers.

6. The catalyst component according to claim 5 in which the monofunctional electron donor compound (MD) is tetrahydrofuran.

7. The catalyst component according to claim 1 in which the Mg/MD molar ratio is higher than 60.

8. The catalyst component according to claim 7 in which the Mg/MD molar ratio is higher than 70.

9. The catalyst component according to claim 1 wherein the titanium compound is selected from the group consisting of $TiCl_4$, $TiCl_3$, and Ti-haloalcoholates of formula $Ti(OR)_{n-y}X_y$, where n is the valence of titanium, y is a number between 1 and n−1, X is halogen and R is a hydrocarbon radical having from 1 to 10 carbon atoms.

10. The catalyst component according to claim 1 which is obtained by contacting a titanium compound of formula $Ti(OR^I)_{4-y}X_y$, where y is a number between 1 and 4, X is halogen, and $R^I$ is a C1-C15 hydrocarbon group, with an adduct of formula $MgCl_2 \cdot pR^{II}OH$, where p is a number between 0.1 and 6, and $R^{II}$ is a hydrocarbon radical having 1-18 carbon atoms, and with a monofunctional electron donor compound (MD) selected from aliphatic esters, amines or ketones, used in such amounts to have Mg/MD molar ratios of at least 50.

11. The catalyst component according to claim 10 in which the titanium compound is $TiCl_4$.

12. The catalyst component according to claim 1 further comprising an electron donor compound (ED), different from (MD).

13. The catalyst component according to claim 12 in which the (ED) compound is selected from the group consisting of diesters, diketones, diamines and diethers.

14. The catalyst component according to claim 13 in which the (ED) compound is selected from $C_1$-$C_{20}$ alkyl or aryl esters of phthalic acids.

15. The catalyst component according to claim 14, wherein the esters of phtahlic acids are diethyl phthalate, di-n-propyl phthalate, di-n-butyl phthalate, di-n-pentyl phthalate, di-i-pentyl phthalate, bis(2-ethylhexyl) phthalate, ethyl-isobutyl phthalate, ethyl-n-butyl phthalate, di-n-hexyl phthalate, or di-isobutylphthalate.

16. A catalyst for the polymerization of olefins $CH_2$=CHR, in which R is hydrogen or a hydrocarbyl radical with 1-12 carbon atoms, comprising the product of the reaction between:
   (i) a catalyst component obtained by contacting:
      (a) a magnesium halide or a suitable precursor of a magnesium halide;
      (b) a monofunctional electron donor compound (MD) selected from aliphatic ethers, esters, amines or ketones, used in such amounts to have Mg/MD molar ratios of at least 50;
      (c) a titanium compound of formula $Ti(OR^I)_{n-y}X_y$, where n is the valence of titanium, y is a number between 1 and n, X is halogen, and $R^I$ is a C1-C15 hydrocarbon group; and optionally,
      (d) an electron donor compound (ED);
   (ii) an alkylaluminum compound; and optionally,
   (iii) at least one external electron-donor compounds.

17. The catalyst according to claim 16 in which the alkylaluminum compound is selected from trialkyl aluminum compounds.

18. The catalyst according to claim 16 in which the external electron-donor is selected from silicon compounds of formula $R_a^5R_b^6Si(OR^7)_c$, where a and b are integer from 0 to 2, c is an integer from 1 to 3 and the sum (a+b+c) is 4; and $R^5$, $R^6$, and $R^7$, are alkyl, cycloalkyl or aryl radicals with 1-18 carbon atoms optionally containing heteroatoms.

19. A process comprising the (co)polymerization of olefins $CH_2$=CHR, in which R is hydrogen or a hydrocarbyl radical with 1-12 carbon atoms, in the presence of a catalyst comprising the product of the reaction between:
(i) a catalyst component obtained by contacting:
(a) a magnesium halide or a suitable precursor of a magnesium halide;
(b) a monofunctional electron donor compound (MD) selected from aliphatic ethers, esters, amines or ketones, used in such amounts to have Mg/MD molar ratios of at least 50;
(c) a titanium compound of formula $Ti(OR^I)_{n-y}X_y$, where n is the valence of titanium, y is a number between 1 and n, X is halogen, and $R^I$ is a C1-C15 hydrocarbon group; and optionally,
(d) an electron donor compound (ED);
(ii) an alkylaluminum compound; and optionally,
(iii) at least one external electron-donor compound.

* * * * *

UNITED STATES PATENT AND TRADEMARK OFFICE
CERTIFICATE OF CORRECTION

PATENT NO.         : 7,316,987 B2
APPLICATION NO. : 10/362695
DATED              : January 8, 2008
INVENTOR(S)        : Gianni Colina et al.

Page 1 of 1

It is certified that error appears in the above-identified patent and that said Letters Patent is hereby corrected as shown below:

At col. 13, line 35, delete "a" and insert instead --the--

At col. 14, line 17, after "aliphatic" insert --ethers,--

Signed and Sealed this

Seventeenth Day of November, 2009

David J. Kappos
*Director of the United States Patent and Trademark Office*